United States Patent [19]

Krisch

[11] Patent Number: 6,035,721
[45] Date of Patent: Mar. 14, 2000

[54] PROCESS FOR COMPENSATING FOR THE INCORRECT OPERATION OF MEASURING DEVICES CAUSED BY EXTERNAL INFLUENCES

[75] Inventor: Burkhard Krisch, Berlin, Germany

[73] Assignee: Siemens AG, Munich, Germany

[21] Appl. No.: 09/029,329

[22] PCT Filed: Aug. 30, 1996

[86] PCT No.: PCT/DE96/01657

§ 371 Date: Jun. 11, 1998

§ 102(e) Date: Jun. 11, 1998

[87] PCT Pub. No.: WO97/09587

PCT Pub. Date: Mar. 13, 1997

[30] Foreign Application Priority Data

Sep. 4, 1995 [DE] Germany .......................... 195 33 505

[51] Int. Cl.[7] .............................. G01L 19/04; G01F 1/86
[52] U.S. Cl. ...................... 73/708; 73/861.02; 73/861.03
[58] Field of Search ...................... 73/708, 1.59, 861.02, 73/861.03

[56] References Cited

U.S. PATENT DOCUMENTS

| 4,563,902 | 1/1986 | Kehnlechner | 73/708 |
|---|---|---|---|
| 4,607,530 | 8/1986 | Chow | 73/708 |
| 4,667,516 | 5/1987 | Schulz | 73/708 |
| 4,802,370 | 2/1989 | EerNisse et al. | 73/708 |
| 4,845,649 | 7/1989 | Eckardt et al. | 364/571.02 |
| 4,866,640 | 9/1989 | Morrison, Jr. | 73/708 |
| 5,022,270 | 6/1991 | Rud, Jr. | 73/708 |
| 5,307,683 | 5/1994 | Phelps et al. | 73/708 |
| 5,319,965 | 6/1994 | Lynch et al. | 73/151 |
| 5,394,345 | 2/1995 | Berard et al. | 73/4 R |
| 5,471,882 | 12/1995 | Wiggins | 73/708 |
| 5,492,016 | 2/1996 | Pinto et al. | 73/708 |

FOREIGN PATENT DOCUMENTS

| 580 462 | 1/1994 | European Pat. Off. . |
|---|---|---|
| 32 18 511 | 3/1983 | Germany . |
| 33 13 260 | 10/1984 | Germany . |
| 33 13 261 | 10/1984 | Germany . |
| 33 40 207 | 5/1985 | Germany . |
| 39 01 789 | 7/1990 | Germany . |
| 43 42 867 | 6/1995 | Germany . |

OTHER PUBLICATIONS

"The Application of Smart Electronics to Improve Pressure Transmitter Performance," Jay E. Corley et al., Proceedings of IECON'84, 1984 International Conference on Industrial Electronics, Control and ?Instrumentation, Tokyo, Japan, vol. 2, Oct. 22–26, 1984, pp. 1081–1086.

"Piezoresistive and Capacitive Pressure Sensors with Integrated Signal Preprocessing," Association Project 1989–1992 Final Report, Berlin Technical University, Fraunhofer Institute for Microelectronic Circuits and Systems, Duisburg and University of Stuttgart, Series: Innovations in Microsystems Technology, vol. 9, VDI/VDE—Technologiezentrum Informationstechnik GmbH [VDI/VDE—Technology Center Information Technology, Inc.], 1994, pp. 19–20.

*Primary Examiner*—William Oen
*Attorney, Agent, or Firm*—Kenyon & Kenyon

[57] ABSTRACT

A process for compensating for an incorrect operation of measuring devices fitted with a programming section caused by external influences. The measuring devices and a sensor responding to the influence are fitted in a chamber exposed to the influencing factor. When the influencing factor changes, measurements from the measuring device and the sensor are detected by a data processing system which provides the programming section of the measuring devices with signals compensating for the incorrect operation caused by the influencing factor. To perform such a process rapidly and thus economically, the influencing factor is continuously changed and the current output value of the sensor and the current measurement provided by the measuring device are detected with a timing predetermined by the data processing system.

6 Claims, 1 Drawing Sheet

PROCESS FOR COMPENSATING FOR THE INCORRECT OPERATION OF MEASURING DEVICES CAUSED BY EXTERNAL INFLUENCES

FIELD OF THE INVENTION

The present invention relates to a process for compensating for incorrect operation of measuring devices caused by changes in temperature.

BACKGROUND INFORMATION

Many known measuring devices do not perform as they should under an external influence. In particular, measuring devices do not perform correctly when temperature is the external influence. This occurs because many measuring devices, or the actual measuring section of such measuring devices, supply output values that are no longer in the necessary proportion to a measured quantity on the input side when the temperature changes. For example, semiconductor-based pressure sensors used in the form of pressure or differential-pressure transducers in measuring devices are frequently so highly dependent on temperature that they no longer satisfy the required measuring accuracy. The specified measuring accuracy can be achieved only by compensating for the temperature-caused errors. Such compensation can be carried out especially well in measuring devices having a programming section. This can be done because, in combination with a data processing system, the programming section can be used to set the relevant measuring device so that its output value remains almost unaffected by changes in temperature. In the case of pressure or differential-pressure transducers, these devices are known as intelligent sensors. The intelligent sensors include the sensor and an associated programming section.

A process is described in a publication "Piezoresistive und kapazitive Drucksensoren mit integrierter Signalvorverarbeitung" (Piezoresistive and Capacitive Pressure Sensors with Integrated Signal Preprocessing), joint project 1989 to 1992, Final Report Technische Universität Berlin, Fraunhofer-Institut für Mikroelektronische Schaltungen und Systeme, Duisberg, and University of Stuttgart, Vol. 9, 1994, pp. 19–20. In this conventional process, pressure sensors having thermal characteristics which are to be compensated for are placed in a temperature test cabinet which is heated in stages for the purpose of compensation. Each time the cabinet is heated to the next higher temperature, implementation of the conventional compensation process is delayed for a certain period of time to ensure that the pressure sensors to be compensated for have indeed reached the temperature set in each case in the cabinet. Once this temperature has been reached, a measurand is supplied from the pressure sensor to a data processing system via a multiplexer. Once the relevant temperature values and the output values of the pressure sensors have been entered in this manner in the data processing system at the predetermined temperature levels, the data processing system generates signals compensating for the temperature dependence and provides them to the programming section of the pressure sensors, thereby ensuring that the output values provided by the pressure sensors are proportional to the measured quantities on the input side regardless of the changes in temperature.

The conventional process for compensating for the incorrect operation of measuring devices (fitted with a programming section) caused by changes in temperature is very time-consuming because detection of the measurand must be delayed for a relatively long period each time the temperature is increased in the chamber of the temperature testing cabinet until the measurement devices to be tested have reached the temperature of the chamber. This considerably increases the production time for the measuring devices or pressure sensors, which makes the manufacture of pressure sensor relatively expensive.

U.S. Pat. No. 5,319,965 describes a pressure recording device in which pressure measurement results unaffected by changes in temperature are obtained by taking into account calibration values stored in a memory. However, this patent does not describe how these calibration values are obtained.

Moreover, a method in which a range of temperatures is traversed without stopping to automatically detect the dependence of measured quantities on temperature is described in German Patent Application No. 33 40 207. Measuring signals corresponding to the measured quantity dependent on temperature are detected with a temperature sensor at predetermined temperatures. An error function that is available for the temperature compensation of measuring signals obtained individually is formed from corresponding value pairs, and another temperature sensor is required to carry out the actual temperature compensation.

A differential-pressure transducer in which a temperature sensor is integrated into the transducer is also described in "IECON '84", Proceedings of 1984 International Conference on Industrial Electronics, Control and Instrumentation, Tokyo, Japan, Vol. 2, Oct. 22–26, 1984, pp. 1081–86. The temperature sensor is used to obtain and take into account correcting quantities to account for the temperature dependence of the output value of the differential-pressure sensor belonging to this transducer. The publication does not describe a specific way in which this is accomplished.

A method for detecting and recording the performance of a pressure sensor depending on changes in temperature is also described in U.S. Pat. No. 4,845,649. This patent does not describe the specifics of how this is accomplished.

European Patent Application No. 0 580 462 describes a process that is largely identical to the process explained in detail above.

SUMMARY OF THE INVENTION

The present invention provides a process for compensating for incorrect operation of measuring devices fitted with a programming section caused by changes in temperature. The measuring devices with the programming sections are placed in a chamber that is exposed the changes in temperature. The chamber also contains a temperature sensor. The measuring devices with the programming section, as well as the temperature sensor, are connected to a data processing system. A measurand quantity is applied to the measuring devices and the temperature in the chamber is changed. The measurands are determined each time the temperature is changed are measured and processed by the data processing system. Signals compensating for the incorrect operation caused by the changes in temperature are provided to the programming section of the measuring devices by the data processing system.

An object of the present invention is to provide a process for compensating for incorrect operation of a measuring device fitted with a programming section caused by temperature so that the process can be carried out much more quickly and therefore more economically.

To achieve the object, measuring devices, each with a temperature sensor positioned immediately adjacent to the actual measuring section, are operated in the process, the temperature is changed continuously and the output value of the temperature sensor and the measurand provided by the measuring devices are detected with a timing predetermined by the data processing system.

An important advantage of the process according to the present invention is that it can be carried out much more quickly than the conventional process described above, thus considerably reducing the production costs. Since the temperature is changed continuously in the process according to the present invention, i.e. there is no delay until the measuring device reaches the temperature in the chamber when using temperature as the influencing factor, this eliminates the waiting times needed in the conventional process. If greater temperature differences occur between the temperature in the chamber containing the measuring devices and the temperature of the measuring device itself, this does not cause any problems because these (highly uniform) temperature differences can be easily compensated for mathematically using the data processing system, since these differences are present in the form of empirical values or can be determined by experiment. This also ensures that, if the pressure sensor has a pressure and differential-pressure transducer, the actual measuring section of the measuring device will have largely the same temperature as the adjacent temperature sensor so that temperature differences between the pressure sensors and the temperature sensors will produce only slight measurand deviations that are largely independent of temperature and can be corrected later on by calibrating the pressure characteristic.

It is particularly advantageous if, in the process according to the present invention, the temperature is continuously increased from an initial low value, the compensating signals are generated when the temperature reaches a maximum value and are transmitted to the programming section of the measuring devices. The temperature is then continuously decreased from its maximum value to the low value while measuring the output value of the sensor and the measurand with the timing predetermined by the data processing system. Then, the measurands are evaluated in the data processing system to check the compensation result. This exemplary embodiment utilizes the fact that the heated chamber must be cooled down after the compensation process before the measuring devices are removed; the cooling process is then used to check the compensation result.

In an advantageous exemplary embodiment of the process according to the present invention, a sensor detecting static pressure (pressure sensor) is assigned to the transducer to compensate for the influence of static pressure on the performance of a differential-pressure transducer used as the measuring device. This allows to set a differential-pressure transducer relatively quickly so that its output value remains largely unaffected by the static pressure.

The present invention can also be used to advantage when a single precision pressure sensor responding to the influence of pressure is placed in the chamber to linearize the pressure characteristic of measuring devices in the form of pressure or differential-pressure sensors, and the pressure in the chamber is changed continuously; the output value of the precision pressure sensor and the values of the pressure or differential-pressure transducers are measured with a timing predetermined by the data processing system during the change in pressure.

In the process for linearizing the pressure characteristic, it is advantageous if the pressure is continuously increased from an initial low value to a maximum value and, once the pressure in the chamber has reached the maximum value, signals linearizing the characteristic are generated by the data processing system and transmitted to the programming section. The pressure is then continuously decreased from the maximum value to the low value while measuring the output value of the precision pressure sensor and the measurands with the timing predetermined by the data processing system, and the measurands are evaluated in the data processing system to check the linearization result. An advantage of this exemplary embodiment of the process according to the present invention is that the measurands for checking the linearization result can be obtained and evaluated simultaneously when the pressure is released in the chamber containing the measuring devices.

BRIEF DESCRIPTION OF THE DRAWING

The FIGURE shows an exemplary embodiment of an arrangement for carrying out the process according to the present invention.

DETAILED DESCRIPTION OF THE INVENTION

Figure 1:
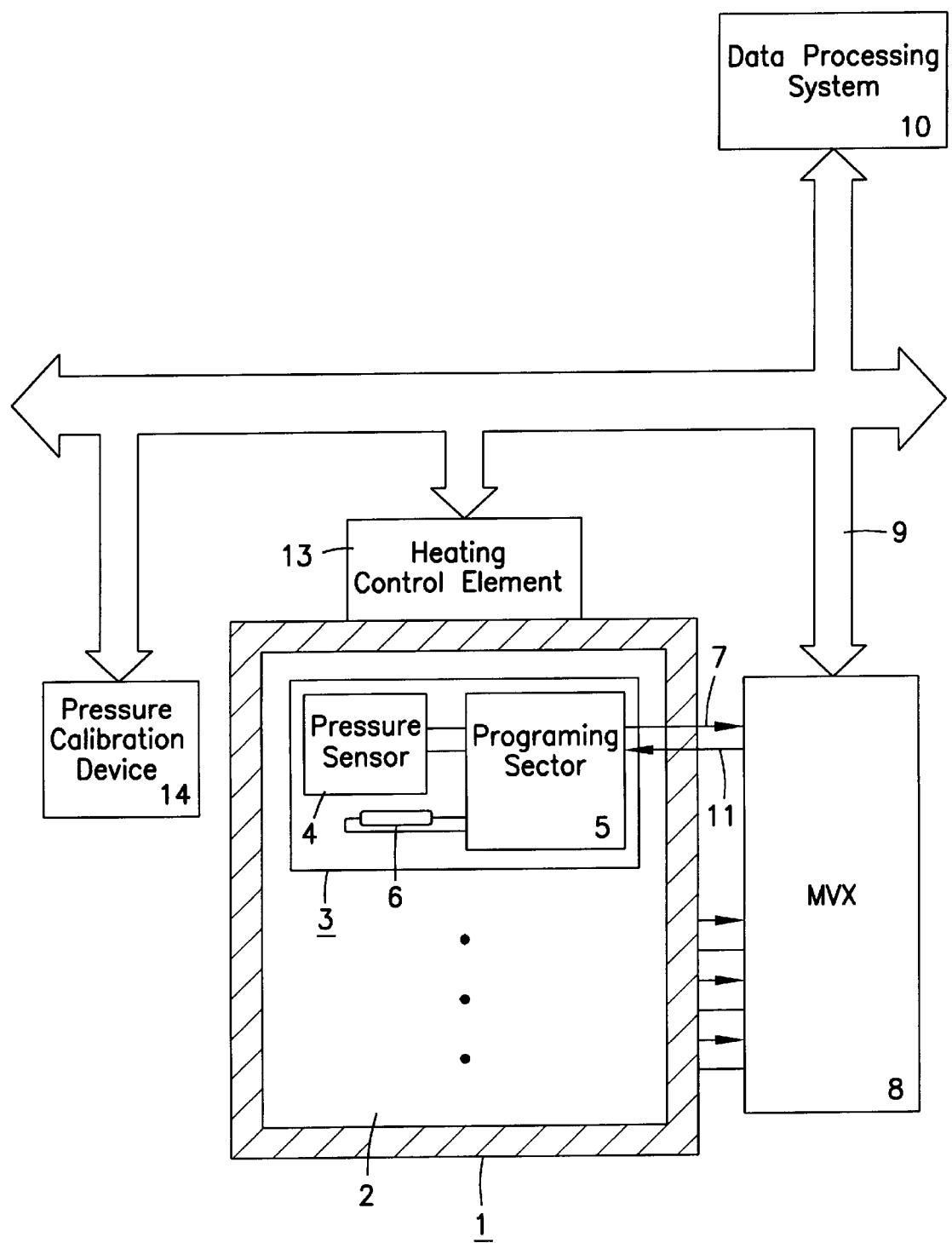

The FIGURE shows an arrangement including a furnace 1 whose inner chamber 2 holds several measuring devices 3, the thermal characteristic of which is to be compensated for here. The FIGURE shows only one measuring device 3, and additional devices of the same construction are indicated by dots.

Each measuring device 3 includes an actual measuring section 4 and a programming section 5. Actual measuring section 4 can be a pressure sensor if measuring device 3 is a pressure or differential-pressure transducer. Programming section 5 is permanently assigned here preferably to a semiconductor-based pressure sensor 4, i.e. an intelligent sensor. A temperature sensor 6 is positioned immediately adjacent to pressure sensor 4 so that this temperature sensor 6 always has the same temperature as adjacent pressure sensor 4. Temperature sensor 6 is also connected to the programming section.

The measuring device 3 is connected to a multiplexer 8 via a first electrical connection 7 to supply measurands from measuring section 4 and temperature sensor 6 via a bus system 9 to a data processing system 10, which is most suitably designed as a personal computer. Signals are transmitted from data processing system 10 to programming section 5 over another electrical connection 11 between multiplexer 8 and actual measuring section 4. These are signals compensating for the thermal characteristic and generated in the manner described below.

Several additional measuring devices with assigned temperature sensors, which are indicated by dots in the FIGURE, are connected to data processing system 10 in the same manner as temperature sensor 6 via additionally suggested electrical connections and via multiplexer 8.

As shown in the FIGURE, furnace 1 is provided with a heating control element 13 which is controlled by data processing system 10 so that the temperature in chamber 2 of furnace 1 changes continuously from a low value to a maximum value. The low value and the maximum value are defined by the temperature range in which the measuring devices to be compensated for are to operate without suffering the effect of the temperature.

As described above, a pressure or differential-pressure transducer is used in the exemplary embodiment as measuring device 3, which is why a pressure calibration device 14 is connected to furnace 1. Using this pressure calibration device, a certain pressure can be set in furnace 1 from data processing system 10, and the pressure then forms the measured quantity on input side for all measuring devices or transducers 3.

According to the present invention, the process is carried out so that, when pressure or differential-pressure transducers are used as measuring devices 3 to be compensated for, chamber 2 in furnace 1 is first cooled down to −40° C. Starting at this lower temperature, data processing system 10 causes the temperature in chamber 2 to increase continuously via heating control element 13. As the temperature in chamber 2 increases continuously in this manner, a measurand provided by sensor 4 is picked up using multiplexer 8 via connection 7 with the timing predetermined by data processing system 10. The output value of temperature sensor 6 is detected at the same time, assigned to the appropriate measurand of pressure sensor 4, and stored in data processing system 10. Measurands provided by pressure sensor 4 and output values of temperature sensor 6 are recorded continuously in this manner until a maximum temperature value of approximately +85° C. is reached; the same procedure is carried out for the remaining pressure sensors using multiplexer 8. Once the maximum temperature of +85° C. has been reached, the measured values are evaluated by data processing system 10 and appropriate signals compensating for the thermal characteristic are generated. These signals are transmitted to programming sections 5 of pressure sensors 4 and used to compensate for the thermal characteristic of the respective transducer.

After programming section 5 has processed the signals from data processing system 10, the temperature in chamber 2 of furnace 1 is again reduced continuously, the output value of pressure sensor 4 is again measured via connection 7 with the operational timing of data processing system 10, and the output value of temperature sensor 6 is also determined via connection 12. These values are again processed in data processing system 10 and the compensation result is checked to see if it is satisfactory. The same procedure is carried out simultaneously for the remaining pressure sensors using multiplexer 8.

When carrying out the process according to the present invention for compensating for the external influence of static pressure in a differential-pressure transducer with a programming section as the measuring device, a difference in pressure with a steady rise in static pressure is applied to the transducer, together with what are normally several identical transducers. To detect the static pressure, each differential-pressure transducer is equipped with a pressure sensor, which is connected to the programming section in the same manner as the temperature sensors in the exemplary embodiment described above. A data processing system, which is connected to the programming section of the respective transducer and is programmed accordingly, supplies the signals compensating for the influence of the static pressure to the programming section.

If, when using pressure or differential-pressure transducers as the measuring devices, linearization of the pressure characteristic is to be carried out as part of the process according to the present invention, a pressure calibration device controlled by a data processing system is used to continuously increase the pressure. The measurands provided by the pressure sensors of the transducer are detected largely simultaneously by the data processing system via a multiplexer. Signals linearizing the pressure sensor characteristic are generated from these measurands in the data processing system and transmitted to the programming unit. When the pressure is released, the characteristic is checked as the pressure decreases continuously. A measurand deviation, which may result from the time difference between pressure selection and measurand detection is corrected later on by calibrating the minimum and maximum values.

What is claimed is:

1. A process for compensating for an incorrect operation of a measuring device caused by temperature changes in the measuring device, the measuring device including a programming section, the process comprising the steps of:

(a) providing the measuring device in a chamber, the measuring device including an actual measuring section, the measuring device providing at least one measurand value;

(b) providing a temperature sensor in the chamber immediately adjacent to the actual measuring section, the temperature sensor providing at least one output value;

(c) coupling the programming section and the at least one temperature sensor to a data processing system, the data processing system processing the at least one measurand value;

(d) providing a measured quantity to the measuring device;

(e) after step (d), gradually and continuously changing a temperature in the chamber at a constant rate of rise;

(f) while performing step (e), detecting the at least one output value and the at least one measurand value, the detecting step being performed at a predetermined frequency, the predetermined frequency being predetermined by the data processing system; and (g) providing, by the data processing system, at least one compensating signal to the programming section, the at least one compensating signal compensating for the incorrect operation of the measuring device as a function of the at least one output value.

2. The process according to claim 1, further comprising the steps of:

continuously increasing the temperature from an initial low value;

when the temperature reaches a maximum value, providing the at least one compensating signal to the programming section;

continuously decreasing the temperature from the maximum value to the low value while detecting the at least one output value and the at least one measurand value at the predetermined frequency; and evaluating by the data processing system the at least one measurand value to determine a compensation result.

3. The process according to claim 1, wherein the measuring device is one of a pressure transducer and a differential-pressure transducer, and the actual measuring section is a first pressure sensor.

4. The process according to claim 3, further comprising the step of:

assigning a second pressure sensor to the measuring device to compensate for an influence of a static pressure on the measuring device.

5. The process according to claim 3, further comprising the step of:

providing a single precision pressure sensor in the chamber to linearize a pressure characteristic of the measuring device, the single precision pressure sensor measuring a pressure in the chamber and providing at least one output pressure value;

continuously changing the pressure; and detecting the at least one output pressure value and the at least one measurand value with the predetermined timing as the pressure changes.

6. The process according to claim 5, further comprising the steps of:

continuously increasing the pressure from a low pressure value to a maximum pressure value;

when the pressure reaches the maximum pressure value, generating the at least one compensating signal linearizing the pressure characteristic by the data processing system and providing the at least one compensating signal to the programming section; and continuously reducing the pressure from the maximum pressure value to the low pressure value while detecting the at least one output pressure value and the at least one measurand value at the predetermined frequency; and evaluating the at least one measurand value in the data processing system to determine a linearization result.

* * * * *